United States Patent [19]

Delfine

[11] Patent Number: 5,566,205
[45] Date of Patent: Oct. 15, 1996

[54] RADIO TRANSCEIVER WITH KEYBOARD CONTROL

[75] Inventor: Frank Delfine, Smithtown, N.Y.

[73] Assignee: Patriot Communications Technology, Inc., St. James, N.Y.

[21] Appl. No.: 381,584

[22] Filed: Jan. 31, 1995

Related U.S. Application Data

[63] Continuation-in-part of Ser. No. 32,346, Mar. 16, 1993, abandoned.

[51] Int. Cl.$^6$ .................................. H04L 5/16; H04B 1/38
[52] U.S. Cl. .................................. 375/219; 455/89
[58] Field of Search .................................. 375/219, 259, 375/272; 455/89, 84, 90

[56] References Cited

U.S. PATENT DOCUMENTS 4,596,022  6/1986  Stoner ............................ 375/272
5,086,434  2/1992  Abe et al. ........................ 375/219
5,201,067  4/1993  Grube et al. ..................... 455/89

*Primary Examiner*—Stephen Chin
*Assistant Examiner*—Hai H. Phan
*Attorney, Agent, or Firm*—Sprung Horn Kramer & Woods

[57] ABSTRACT

A radio transceiver comprises a controllable transmitter and receiver, a microprocessor connected to the transmitter and receiver to supply digital data thereto and to receive digital data therefrom, an interface connectable to a keyboard to receive data. The transmitter and receiver, the microprocessor and the interface are enclosed in the housing. Manual controls in the housing control all of the functions of the transmitter and receiver, and the microprocessor can receive inputs from the keyboard to emulate the manual controls.

11 Claims, 2 Drawing Sheets

RADIO TRANSCEIVER WITH KEYBOARD CONTROL

This application is a continuation-in-part application of U.S. application Ser. No. 08/032,346, filed Mar. 16, 1993 and now abandoned.

BACKGROUND OF THE INVENTION

The present invention is related to a radio transceiver and in particular to a transceiver which can be controlled via a computer keyboard.

The current state of technology for radio transceivers is illustrated in FIG. 1. A transceiver 5 can be controlled by a full function keyboard 1 only when it is interfaced via an external computing device, such as an IBM PC/XT/AT microcomputer 2 which has a keyboard interface built into it. The microcomputer 2 has two serial RS-232C type output ports SO1 and SO2 which must be utilized in order to control the transceiver 5.

Control of the panel lights of the transceiver 5 and the sensing of the positions or states of switches thereon is handled by a microprocessor in the transceiver. In order to control the mode of the transceiver from the keyboard, the microcomputer must communicate with the microprocessor from serial port SO1 into serial port SI1 and to provide automatic code generation via the keyboard 1, the second serial port SO2 of the microcomputer 2 is utilized. However, a direct connection between the microcomputer and the transceiver is not possible and an additional interface must be added. This interface is known as a terminal unit 4 or a multimode data controller. The terminal unit 4 has a serial input SI2 connected to the serial output SO2 of the microcomputer and translates digital data from the microcomputer into an audio output at output AO which is connected into the microphone input MI of the transceiver 5. The terminal unit takes the digital input and by audio frequency shift keying (AFSK) it alternately applies one of two tones to the microphone input of the transceiver in response to the high and low state of the digital input signal. If it is desired to perform the same function when the transceiver receives data, then a similar terminal unit must be provided for decoding or demodulating the audio output signal from the transceiver and this data must be then fed into the microcomputer 2 so that it can be displayed on display 3.

SUMMARY OF THE INVENTION

The main object of the present invention is to provide an improved radio transceiver, and in particular, an amateur or HAM radio, which permits keyboard control and reducing the amount of equipment and the number of connections necessary to carry this out.

This and other objects and advantages of the present invention are achieved in accordance with the present invention by the radio transceiver in accordance with the present invention wherein all of the functions of data transfer are integrated into the radio transceiver itself. Since a microprocessor is already required within the transceiver for the normal control functions of the front panel lamps and indicators and scanning switches and encoders, this same microprocessor is now utilized to its fullest capacity by including an interface for a full function keyboard as well as integrating the hardware and software functions of the terminal unit and multimode data controller into the same physical and computational space as the radio transceiver itself.

The result is an extremely compact and cost effective integrated package. The keyboard may be of any type and this includes self-scan decoder types which transfer their data over serial link, such as that used in the IBM PC/XT/AT and compatible computers, as well as a non-encoded type which must be scanned by the microprocessor of the transceiver.

The radio transceiver has front panel mounted manual controls in the form of pushbuttons and knobs which fully control the operation thereof as an amateur radio. The rear panel of the radio has an input connector preferably for a full function 101 key keyboard.

The keyboard is used to alternatively control all of the functions associated with the normal operation of the radio transceiver that are controlled by the panel mounted manual controls, such as frequency control, filter selection, etc., as well as special functions associated with the automatic transmission and reception and decoding of Morse or digital data modes. This eliminates the need for a computer or a terminal with a terminal node controller unit. In addition, it makes operation easier and simpler.

Moreover, the integrated radio transceiver can be taken one step further by providing the necessary internal hardware to allow the transceiver to be expanded to include support for peripheral devices, such as a serial/parallel line printer for producing a hardcopy of data and a hard or floppy disk drive which may reside either internal or external to the transceiver itself. A software operating system can then be included in the transceiver to control application software to tie the entire package together and allow for easy expansion and future upgrade.

Another advantage of the present invention is that data transferred between the microprocessor and the receiver and transmitter can be done by frequency shift keying (FSK) which alternately shifts the transmitted frequency of the transceiver to achieve the same effect as AFSK. This is a preferred method to use since the external digital data stream is presented to the transceiver oscillator directly or through the internal control computer which then varies the frequency.

The radio transceiver in accordance with the present invention contains the multimode data controller as an integral part of the transceiver control microprocessor. The FSK generation is accomplished directly by the microprocessor since it already has the data stream to be sent contained in its memory. This data is captured from the keyboard and is plugged into the internal control microprocessor. This microprocessor controls a display of the data to its front panel so that the user can enter and edit the data for later retransmission or in real time as the data is being sent over the air. This architecture eliminates the need for the two RS232 serial ports used in the prior art to control basic transceiver functions, such as frequency and mode and to feed serial data to a terminal unit for conversion to the AFSK format required for radio transmission.

These and other features of the present invention are described in more detail with reference to the following detailed description of the invention and the attached drawings wherein:

DETAILED DESCRIPTION OF THE INVENTION

Figure 1:
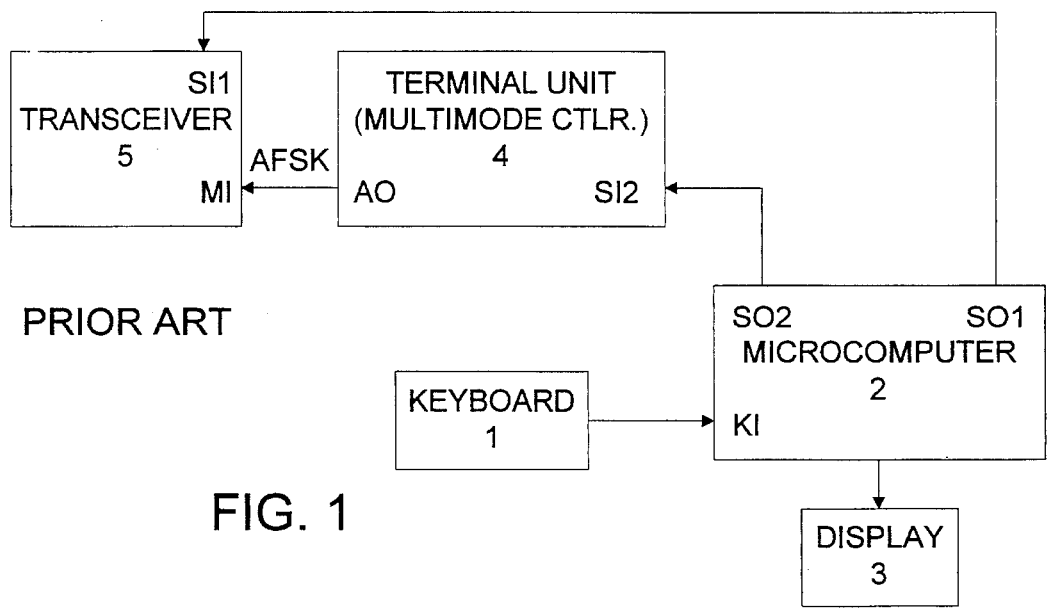
FIG. 1 is a block diagram of a prior art radio transceiver system.
Figure 2:
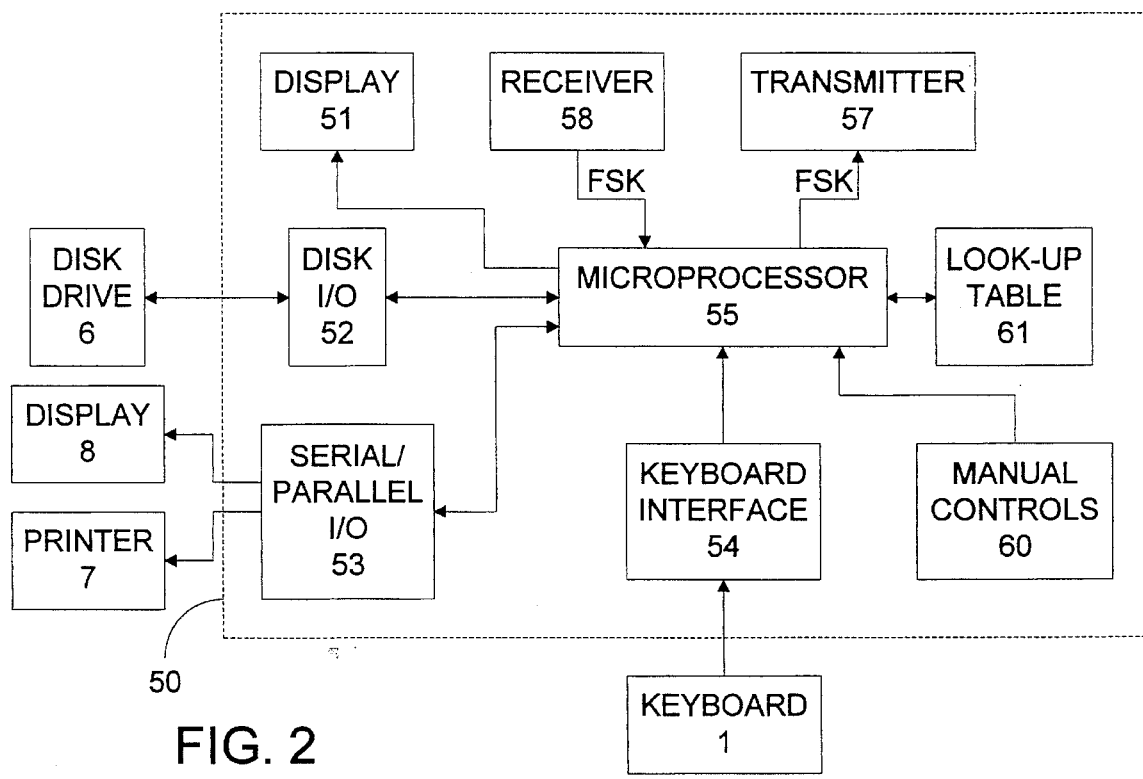
FIG. 2 is a block diagram of a radio transceiver according to the present invention.

Referring now to FIG. 2, the transceiver 50 according to the present invention includes a microprocessor 55, such as an Intel 80386, 80486 or controller such as the 8031 series and which has associated elements such as a ROM and RAM for processing data. The transceiver 50 also includes a keyboard interface 54 built within the same housing as the microprocessor and which has an external connector to which a keyboard 1, preferably a full 101 key IBM PC keyboard with function keys, Shift keys and Alt keys is connectable for use. The microprocessor is able to receive data and function inputs from the keyboard 1 via the keyboard interface 54.

The microprocessor 55 is also connected via direct digital data outputs to a transmitter 57 and a receiver 58. The data from the microprocessor and to the microprocessor is used to generate the FSK shifts on transmit and to decode the data on receive. The data stream is presented to the transmitter synthesized oscillator directly via a control program to vary the frequency thereof. Similarly, data received is digitized in the receiver and applied as a data stream to the microprocessor.

The microprocessor also controls a display 51 which displays data that is being transmitted and data which is received.

Optionally, the transceiver can also include a disk input/output interface 52, as well as a serial/parallel input/output interface 53. By means of these two interfaces, a disk drive 6, a printer 7 and an external display 8 can be connected to the transceiver through external connectors and can be driven to provide further capabilities for the transceiver. Among these capabilities is a direct logging function which will keep a record of on the air activity. Data for this log can be gotten directly from the control processor (i.e. time, date, frequency, mode, etc.) and from keyboard entered data (i.e. call sign of station spoken to, signal reports, memos, etc.).

As can be seen from FIG. 2, the transceiver 50 accomplishes the frequency shift keying directly by microprocessor 55, since it already has the data stream to be sent stored in a buffer memory from the keyboard 1. The microprocessor can control the display of data on display 51 so that the user can enter and edit data for later retransmission or during real time transmission. The internal microprocessor control eliminates the need for the RS232 type links between the transceiver and a keyboard or other control device.

The radio is controlled by the operator by means of manual controls 60 mounted on a front panel 80 (FIGS. 3 and 4) of the radio. The controls, as shown in detail in FIG. 4, include pushbuttons 81a–l, 82a–p and knobs 83–87. The functions of the switches and knobs are summarized in Table I.

The microprocessor 55 scans the manual controls 60 for a depression of a pushbutton or a turning of a knob and translates that into a manual control command signal for the radio. If the operator wants to use the keyboard instead of the panel mounted controls, the microprocessor receives the results of key actuations at the interface 54 which converts same to ASCII code. That code is then applied by the microprocessor 55 to look-up table 61 which converts the code to a signal emulating the corresponding manual control command signal so that the same function can be carried out.

Table I shows the correspondence between the manual controls on the front panel and keyboard combinations that will result in the same function being carried out.

Thus the keyboard can be used for the transceiver control, such as the frequency, mode, etc. and for data entry which is to be sent via the transmitter or for logging purposes. The addition of a print device will allow hardcopy logs to be generated directly from the transceiver itself.

An operating system can be stored with the microprocessor 55 so that it can control the disk drive 6 and printer 7 or other peripheral devices.

Figure 4:
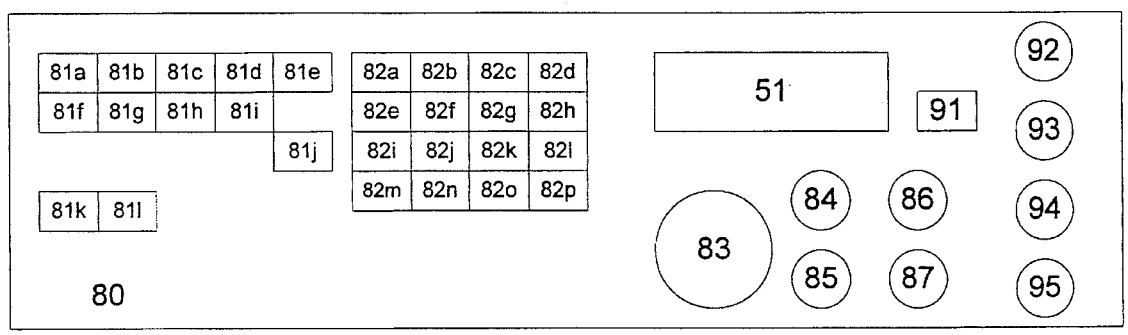
FIG. 4 shows the front panel of the radio transceiver of FIG. 3.

The radio also includes an S-meter 91 (FIG. 4) for indicating signal strength, a headphone input 92, a straight key input 93, a paddle input 94 and a microphone input 95 (all shown in FIG. 4).

As an amateur radio transceiver, the present invention works in the standard amateur radio modes AM, FM, USB, LSB, CW and digital modes such as RTTY. The radio has a band pass filter (BPF) and Notch filter which can be turned on or off. The decode function places the radio in an automatic decode mode for the CW or digital mode (RTTY) functions. The output scrolls along the top of the display 51.

When the SYNC mode is on, the RX and TX frequencies are adjusted together and when this mode is off, the RX and TX frequencies can be independently adjusted via the main tuning dial. The memory control buttons control the storing of the radio status in the microprocessor associated memory and allow the status to be stored, recalled or scrolled through.

Variable speed tuning allows the adjustment in the size of the tuning steps.

All of the above-mentioned functions, as well as RIT, AGC, Spot, Band Select, T/R Tune, QSK, Frequency Lock and Direct Frequency Entry, are standard amateur radio functions and are well known to those in the field.

Figure 3:
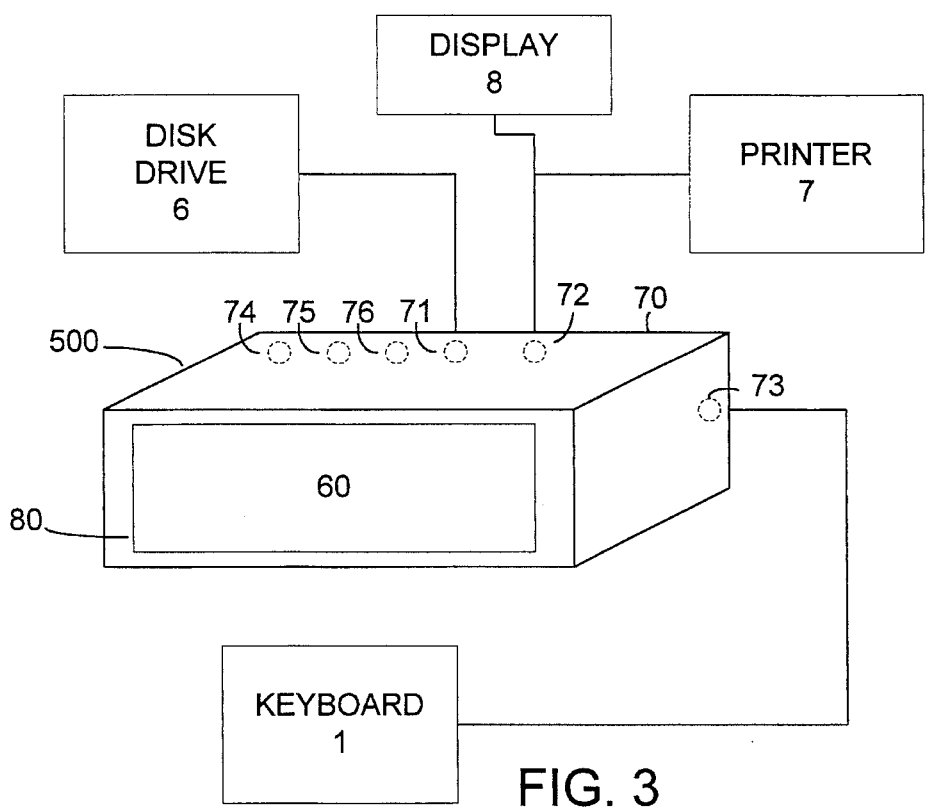
FIG. 3 shows the system of the present invention.

FIG. 3 shows the transceiver 50 in a single housing 500 which holds components 52–55, 57, 58 and 61 and has displays 51 and 91 and switches 60 exposed to view on front panel 80. The transceiver also includes a microphone input 95 on the front panel of housing 500. On a rear panel 70 are connectors 71, 72 and 73 for the disk drive, printer and keyboard respectively and three connectors 74–76 for antennas.

It is understood that the embodiments described hereinabove are merely illustrative and are not intended to limit the scope of the invention. It is realized that various changes, alterations, rearrangements and modifications can be made by those skilled in the art without substantially departing from the spirit and scope of the present invention.

TABLE I

| Panel Key | Function | Keyboard Key |
|---|---|---|
| 81a | UBS | F5 |
| 81b | LSB | F5 |
| 81c | CW | F5 |
| 81d | RTTY | F5 |
| 81e | DECODE | ALT-F2 |
| 81f | MEM STORE | F7 |
| 81g | SCROLL UP | ↑ |
| 81h | SCROLL DN | ↓ |
| 81i | MEM RCL | F6 |
| 81j | ATTENUATE | SH-F4 |

TABLE I-continued

| Panel Key | Function | Keyboard Key |
|---|---|---|
| 81k | ANT SEL | ALT-F4 |
| 81l | VST | ALT-F5 |
| 82a | SYNC | F1 |
| 82b | RIT | F2 |
| 82c | RX TO TX | F3 |
| 82d | TX TO RX | F4 |
| 82e | BPF | SH-F3 |
| 82f | NOTCH CKT | none |
| 82g | RTTY MENU | SH-F5 |
| 82h | AGC | SH-F6 |
| 82i | SPOT | SH-F7 |
| 82j | KEY SPEED | SH-F2 |
| 82k | POWER | SH-F8 |
| 82l | BAND SEL | F8 |
| 82m | T/R TUNE | F10 |
| 82n | QSK | SH-F9 |
| 82o | FREQ LOCK | F9 |
| 82p | DIR FREQ | SH-F1 |
| 83 | MAIN TUNE | → ← |
| 84 | SENSITIVITY | none |
| 85 | RF POWER | none |
| 86 | NOTCH | none |
| 87 | AF GAIN | none |

What is claimed is:

1. A radio transceiver comprising: a transmitter for sending data with a carrier frequency; a receiver for receiving data with a carrier frequency; a microprocessor connected to the transmitter and receiver to supply digital data thereto and to receive and decode digital data therefrom; a housing having the transmitter and receiver and the microprocessor enclosed therein; manual controls mounted on the housing and exposed to an operator, wherein the manual controls are actuatable during use to produce manual control command signals applied to the microprocessor for controlling all functions of the transmitter and receiver; a keyboard having alphanumeric and function keys actuatable by an operator during use, wherein the keyboard is separate from the housing; an interface in the housing and connected to the keyboard during use to apply keyboard data from the keyboard to the microprocessor; and wherein the microprocessor has an emulation circuit receptive of keyboard data from the keyboard interface in response to actuation of keyboard keys by an operator for converting the keyboard data into corresponding manual control command signals to emulate actuation of the corresponding manual controls, wherein the keyboard is used to alternately control all of functions associated with the normal operation of the radio transceiver that are controlled by the mounted manual controls as well as special functions associated with the automatic transmission and reception and decoding of Morse or digital data modes.

2. The radio transceiver according to claim 1, wherein the transmitter comprises a shift keyable oscillator and wherein the microprocessor has circuitry for applying shift keying data directly to the oscillator.

3. The radio transceiver according to claim 1, further comprising a display in the housing and controlled by the microprocessor.

4. The radio transceiver according to claim 1, further comprising a disk drive controller in the housing and controlled by the microprocessor.

5. The radio transceiver according to claim 1, further comprising a printer controller in the housing and controlled by the microprocessor.

6. The radio transceiver according to claim 1, wherein the manual controls comprise pushbuttons and knobs.

7. The radio transceiver according to claim 1, wherein the manual controls are mounted on a front panel of the housing.

8. The radio transceiver according to claim 1, wherein the radio transceiver is an amateur radio transceiver.

9. The radio transceiver according to claim 1, further comprising an input/output circuit connected to the microprocessor for controlling an external display.

10. The radio transceiver according to claim 1, wherein the emulation circuit comprises a look-up table which converts ASCII code to signals emulating corresponding manual control command signals.

11. The radio transceiver according to claim 1, wherein the radio transceiver is an amateur radio transceiver having manual controls comprising pushbuttons and knobs on a front panel of the housing.

* * * * *